(12) United States Patent
Tai et al.

(10) Patent No.: US 8,172,445 B2
(45) Date of Patent: May 8, 2012

(54) BACKLIGHT MODULE

(75) Inventors: Ming-Cheng Tai, Fenyuan Township (TW); Yi-Hui Chang, Hsinchu (TW); Li-Chiao Huang, Hsinchu (TW)

(73) Assignee: Chimei Innolux Corporation, Chu-Nan (TW)

( * ) Notice: Subject to any disclaimer, the term of this patent is extended or adjusted under 35 U.S.C. 154(b) by 367 days.

(21) Appl. No.: 12/501,379

(22) Filed: Jul. 10, 2009

(65) Prior Publication Data
US 2010/0008067 A1  Jan. 14, 2010

(30) Foreign Application Priority Data
Jul. 14, 2008 (TW) .............................. 97126608 A

(51) Int. Cl.
*F21V 7/04* (2006.01)
*G09F 13/04* (2006.01)
*G09F 13/08* (2006.01)

(52) U.S. Cl. ....... 362/606; 362/627; 362/97.1; 362/97.2

(58) Field of Classification Search ................ 362/606, 362/607, 618, 619, 620, 627, 559, 561, 97.1, 362/97.2; 349/64
See application file for complete search history.

(56) References Cited

U.S. PATENT DOCUMENTS

| | | | | |
|---|---|---|---|---|
| 6,771,020 B1 * | 8/2004 | Wang | ............................ | 313/506 |
| 7,118,264 B2 * | 10/2006 | Tseng et al. | .................. | 362/561 |
| 7,186,014 B2 * | 3/2007 | Shimura | ...................... | 362/606 |
| 7,234,854 B2 * | 6/2007 | Masamoto | .................... | 362/612 |
| 7,380,953 B2 * | 6/2008 | Onishi et al. | .................... | 362/29 |
| 7,630,037 B2 * | 12/2009 | Shimura | ...................... | 349/115 |
| 2007/0019393 A1 * | 1/2007 | Tsai | .............................. | 362/26 |
| 2007/0139966 A1 * | 6/2007 | Kim et al. | ......................... | 362/616 |
| 2009/0040426 A1 * | 2/2009 | Mather et al. | .................. | 349/65 |
| 2009/0086506 A1 * | 4/2009 | Okumura | ...................... | 362/613 |
| 2009/0147537 A1 * | 6/2009 | Iwasaki | ......................... | 362/620 |

* cited by examiner

*Primary Examiner* — David Crowe
(74) *Attorney, Agent, or Firm* — Liu & Liu

(57) ABSTRACT

A backlight module can be used in a dual display module and capable of blurring the shadow image produced by the sub display window in the main display window, while the main display window is displaying images, is disclosed. The disclosed backlight module comprises: a light emitting unit, a first frame located on one side of the light emitting unit and a first display window is enclosed by the first frame, a second frame located on the other side of the light emitting unit opposing to the first frame and a second display window is enclosed by the second frame, and a light diffusing plate, wherein the display area of the second display window is larger than the display area of the first display window. Besides, the light diffusing plate has a smooth surface and a rough surface respectively, while the rough surface is facing the light emitting unit.

20 Claims, 11 Drawing Sheets

PRIOR ART

PRIOR ART

BACKLIGHT MODULE

BACKGROUND OF THE INVENTION

1. Field of the Invention

The present invention relates to a backlight module and, more particularly, to a backlight module that is adaptable to a dual display module and capable of blurring the shadow image produced by the sub display window in the main display window, while the main display window is displaying images.

2. Description of Related Art

In recent years, the number of the applications using a dual display module has gradually increased, such as a clamshell cellular phone, or a wall-passing type dual display device. In the past, due to the limitation of the technology level, the dual display module could only be manufactured by connecting two display modules back to back, for displaying different images at the same time. However, this kind of dual display module not only has a certain thickness, but also has duplicated elements, such as the two backlight modules respectively for the two display modules.

For solving these two problems, a conventional backlight module applied in a dual display module is proposed, which can reduce the thickness of the dual display module and minimize the weight thereof. The structure of the conventional backlight module applied in a dual display module is shown in FIG. 1A, and FIG. 1B, wherein FIG. 1A is a perspective view of the conventional backlight module applied in a dual display module, and FIG. 1B is a cross sectional view taken along plane AA' of FIG. 1A.

As shown in FIG. 1A and FIG. 1B, the conventional backlight module applied in a dual display module (not shown in the figures) comprises: a light guide plate 11, a light emitting unit 12, a first frame 13, a second frame 14, and a tape layer 15; wherein the light emitting unit 12 is a light emitting diode light bar located on one side edge 111 of the light guide plate 11. Besides, the first frame 13 is located below the light guide plate 11 and a first display window 131 is enclosed by the first frame 13. The second frame 14 is located above the light guide plate 11 and a second display window 141 is enclosed by the second frame 14. On the other hand, the first frame 13 has a first frame surface 132, and the tape layer 15 is located on the first frame surface 132. Upon the requirement on the optical performance of the conventional backlight module, the tape layer 15 may consist of a white tape or a black tape.

Moreover, as shown in FIG. 1A, the conventional backlight module applied in a dual display module can further comprise a first diffusing film 161 located between the tape layer 15 and the light guide plate 11, and a first brightness enhancement film 171 located between the tape layer 15 and the first diffusing film 161, wherein the first brightness enhancement film 171 is located under a whole surface of the first diffusing film 161. In the same manner, the conventional backlight module applied in a dual display module can further comprise a second diffusing film 162 located between the second frame 14 and the light guide plate 11, and a second brightness enhancement film 172 located between the second frame 14 and the second diffusing film 162.

Therefore, when the main display window (i.e. the second display window 141) of the conventional backlight module applied in a dual display module displays images, the light originally irradiated on the periphery portions of the sub display window (i.e. the first display window 131), i.e. the first frame surface 132, will arrive at the tape layer 15, instead. Therefore, only a small portion of the light will be reflected by the tape layer 15 and reach the light guide plate 11. Moreover, the tape layer 15 can only diffuse the reflected light to a limited level.

As described above, the tape layer 15 of the conventional backlight module applied in a dual display module may consist of a black tape or a white tape, but these two kinds of tapes both have their own drawbacks, which will be described later. If the tape layer 15 consists of a black tape, the shadow image produced by the sub display window in the main display window while the main display window is displaying images, will be blurred a little bit. However, since the amount of the light reflected by the tape layer 15 consists of a black tape is also reduced, the display brightness of the main display window is reduced dramatically as well. On the other hand, if the tape layer 15 consists of a white tape, the display brightness of the main display window will be maintained at a certain level. However, the shadow image produced by the sub display window in the main display window, while the main display window is displaying images, will be more obvious than the previous case.

In other words, by having the tape layer consist of a black tape or a white tape, the conventional backlight module applied in a dual display module cannot blur the shadow image produced by the sub display window in the main display window, while the main display window is displaying images, and increase the display brightness of the main display window at the same time.

Therefore, a backlight module that can blur the shadow image produced by the sub display window in the main display window, while the main display window is displaying images, and can increase the display brightness of the main display window at the same time is required.

SUMMARY OF THE INVENTION

The object of the present invention is to provide a backlight module being capable of blurring the shadow image produced by the sub display window in the main display window, while the main display window is displaying images.

Another object of the present invention is to provide a backlight module being capable of increasing the display brightness of the main display window.

To achieve the object, the backlight module of the present invention comprises: a light emitting unit; a first frame located on one side of the light emitting unit and a first display window is enclosed by the first frame, wherein the first frame has a first frame surface; a second frame located on the other side of the light emitting unit opposing to the first frame and a second display window is enclosed by the second frame, wherein the display area of the second display window is larger than the display area of the first display window; and a light diffusing plate located between the first frame surface of the first frame and the light emitting unit, wherein the light diffusing plate has a smooth surface and a rough surface respectively on the two sides thereof; wherein the rough surface of the light diffusing plate is facing the light emitting unit.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
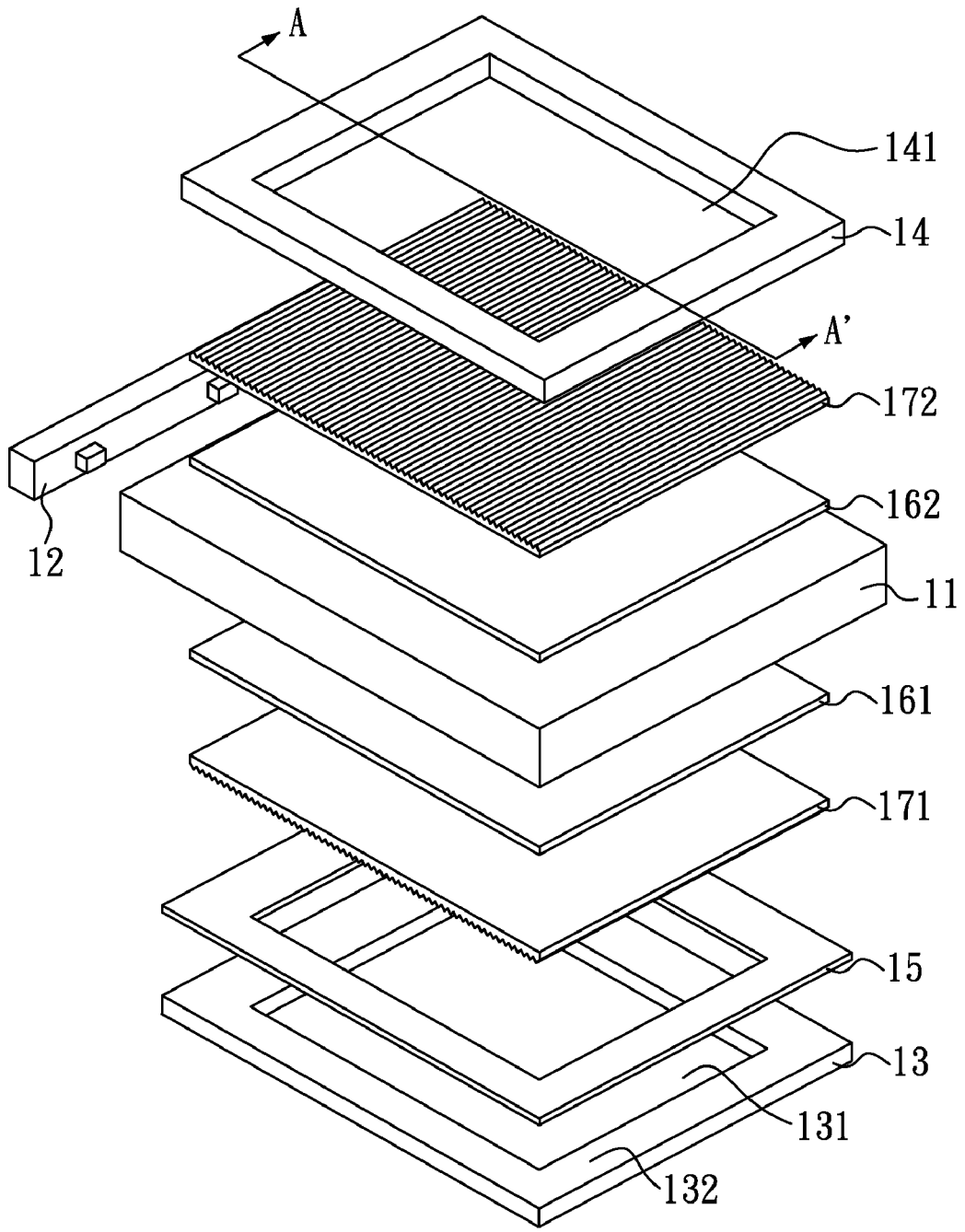
FIG. 1A is a perspective view of a conventional backlight module applied in a dual display module.
Figure 1B:
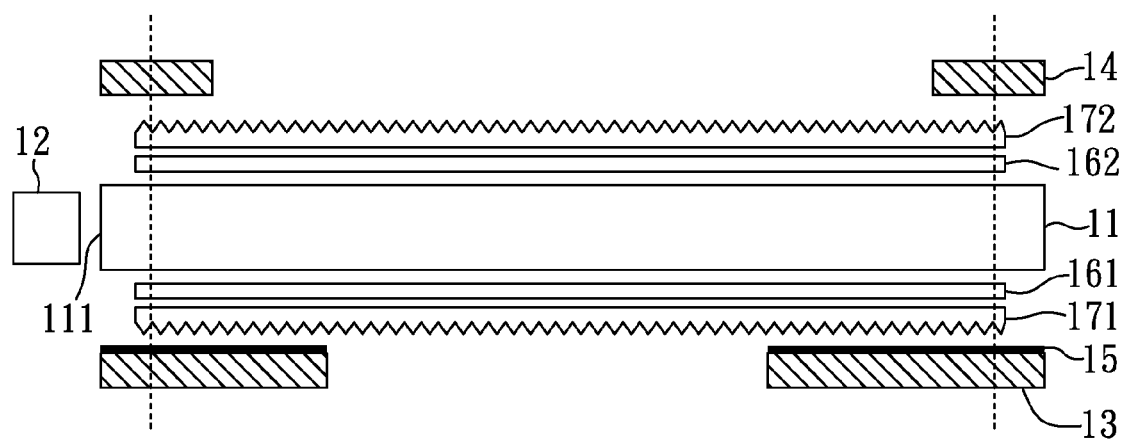
FIG. 1B is a cross sectional view taken along plane AA' of FIG. 1A.
Figure 2A:
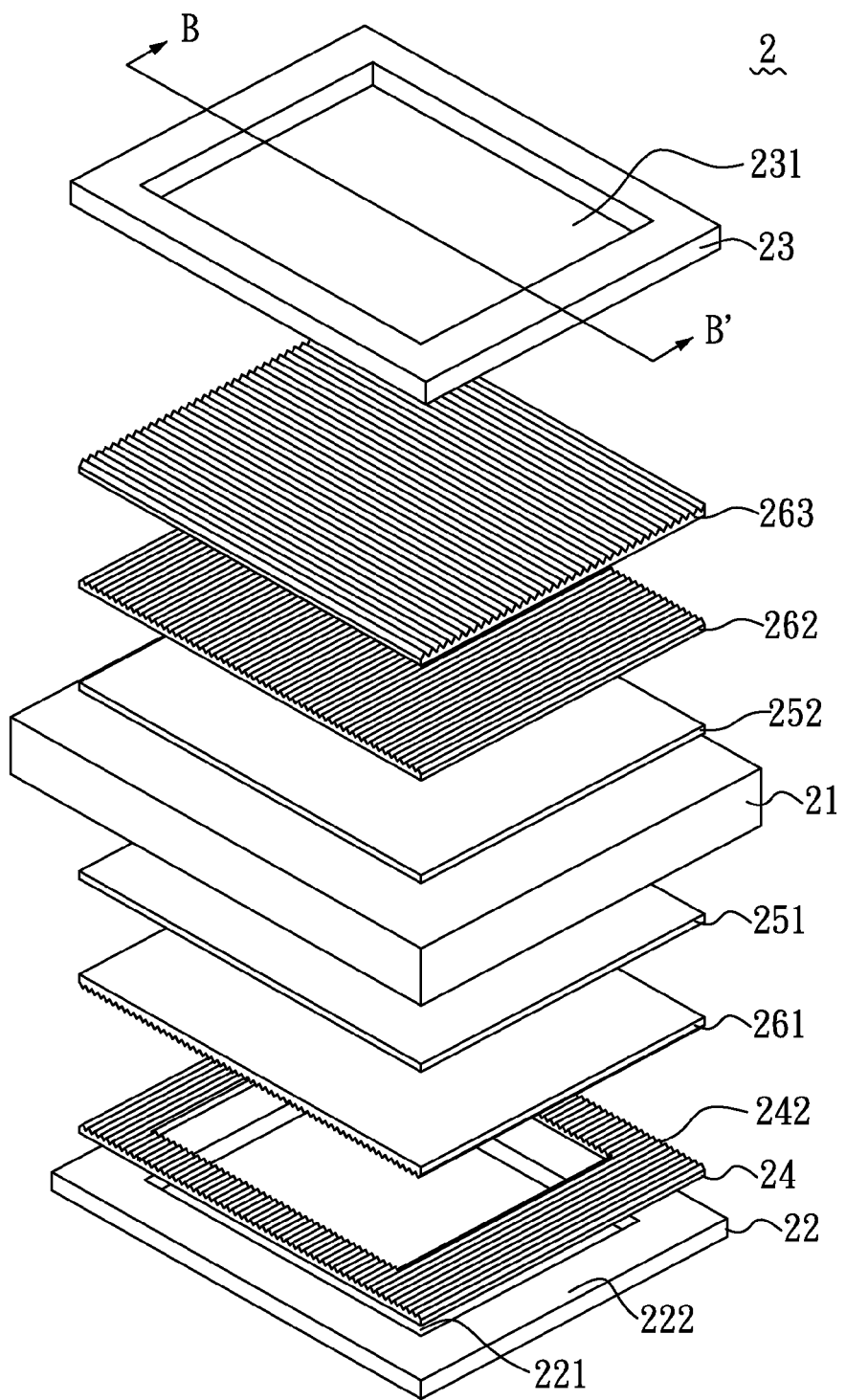
FIG. 2A is a perspective view of the backlight module according to a first embodiment of the present invention.
Figure 2B:
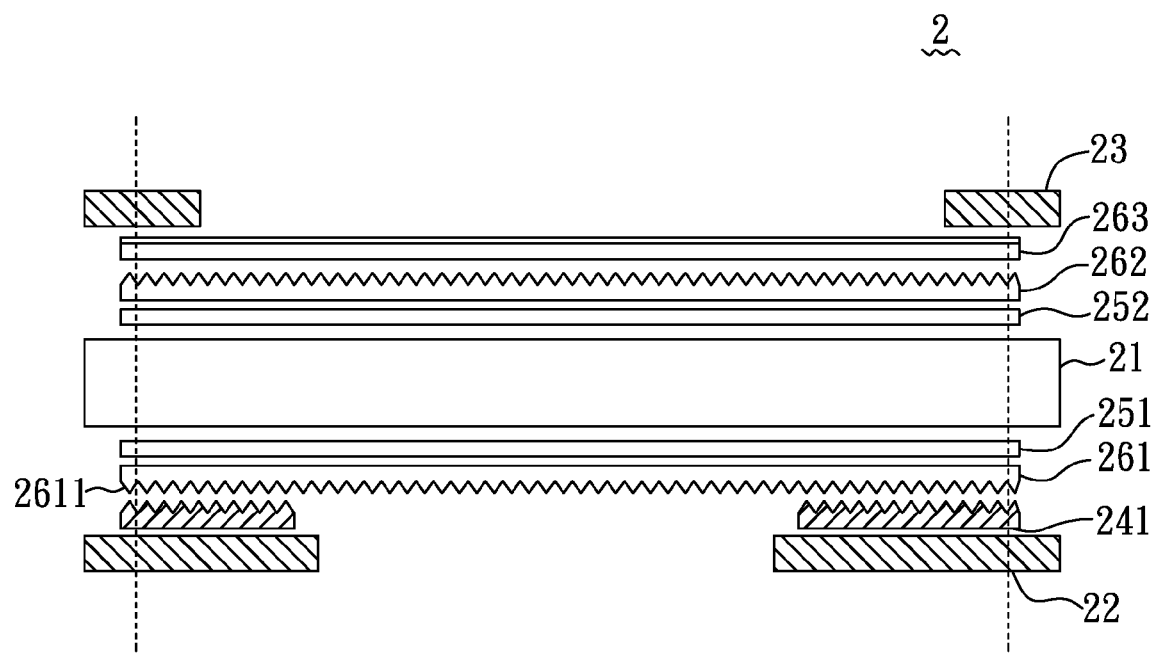
FIG. 2B is a cross sectional view taken along plane BB' of FIG. 2A.

With reference to FIG. 2A and FIG. 2B, wherein FIG. 2A is a perspective view of the backlight module according to a first embodiment of the present invention, and FIG. 2B is a cross sectional view taken along plane BB' of FIG. 2A.

As shown in FIG. 2A and FIG. 2B, the backlight module 2 is applied in a dual display module (not shown in the figures) and comprises: a light emitting unit 21, a first frame 22, a second frame 23, and a light diffusing plate 24; wherein the light emitting unit 21 is an organic electro luminescence light emitting unit (OLED), such as a white light organic electro luminescence light emitting unit. Besides, the first frame 22 is located below the light emitting unit 21 and a first display window 221 is enclosed by the first frame 22. The second frame 23 is located above the light emitting unit 21 and a second display window 231 is enclosed by the second frame 23. On the other hand, the first frame 22 has a first frame surface 222, and the light diffusing plate 24 is located between the first frame surface 222 of the first frame 22 and the light emitting unit 21. The light diffusing plate 24 has a smooth surface 241 and a rough surface 242 respectively on the two sides thereof; wherein the rough surface 242 is facing the light emitting unit 21.

As shown in FIG. 2A, the display area of the second display window 231 is larger than the display area of the first display window 221, thus the second display window 231 is referred to as the "main display window", and the first display window 221 is referred to as the "sub display window".

Moreover, as shown in FIG. 2A and FIG. 2B, the backlight module 2 can further comprise a first diffusing film 251 located between the light diffusing plate 24 and the light emitting unit 21, and a first brightness enhancement film 261 located between the light diffusing plate 24 and the first diffusing film 251. In the same manner, the backlight module 2 can further comprise a second diffusing film 252 located between the second frame 23 and the light emitting unit 21, and a second brightness enhancement film 262 located between the second frame 23 and the second diffusing film 252.

It should be noted that, in some situations, for example, where the backlight module according to various embodiments of the present invention is required to have higher brightness and better uniformity, the backlight module 2 can further comprise a third brightness enhancement film 263 located between the second frame 23 and the second brightness enhancement film 262, for distributing the light from the second display window 231 (i.e. the main display window) more uniformly. Moreover, for brightness enhancement, the prism direction of the third brightness enhancement film 263 can be perpendicular to the prism direction of the second brightness enhancement film 262.

Besides, the aforementioned first diffusing film 251, the first brightness enhancement film 261, the second diffusing film 252, the second brightness enhancement film 262, and the third brightness enhancement film 263 are all optional optical elements. In other words, depending on the requirement of the optical performance, the backlight module according to various embodiments of the present invention can include different quantities of different types of diffusing films and/or brightness enhancement films to meet the requirement.

Refer to FIG. 2A and FIG. 2B again, the first brightness enhancement film 261 of the backlight module 2 can be a prism brightness enhancement film, and the prism surface 2611 of the prism brightness enhancement film is opposed to the rough surface 242 of the light diffusing plate 24. Moreover, in the present embodiment, the light diffusing plate 24 is also a prism brightness enhancement film, and the aforementioned rough surface 242 is a one dimensional prism matrix comprising plural prism bars with their longitudinal axes parallel to each other.

Therefore, when the main display window (i.e. the second display window 231) of the backlight module 2 displays, the light originally irradiated on the periphery portions of the sub display window (i.e. the first display window 221), i.e. the first frame surface 222, will arrive at the light diffusing plate 24, instead. Then, the light passes through the rough surface 242 of the light diffusing plate 24 and reaches the smooth surface 241 of the light diffusing plate 24. Some of the light is reflected at the 25 smooth surface 241 due to the "total reflection effect". Finally, the reflected light transmits from the rough surface 242 of the light diffusing plate 24 to the light emitting unit 21. As a result, the light originally irradiated on the periphery portions of the sub display window (i.e. the first frame surface 222) will not cause a shadow image on the main display window (i.e. the second display window 231). In other words, the shadow image produced by the sub display window in the main display window, while the main display window is displaying, can be blurred, and even be eliminated thoroughly.

Figure 3A:
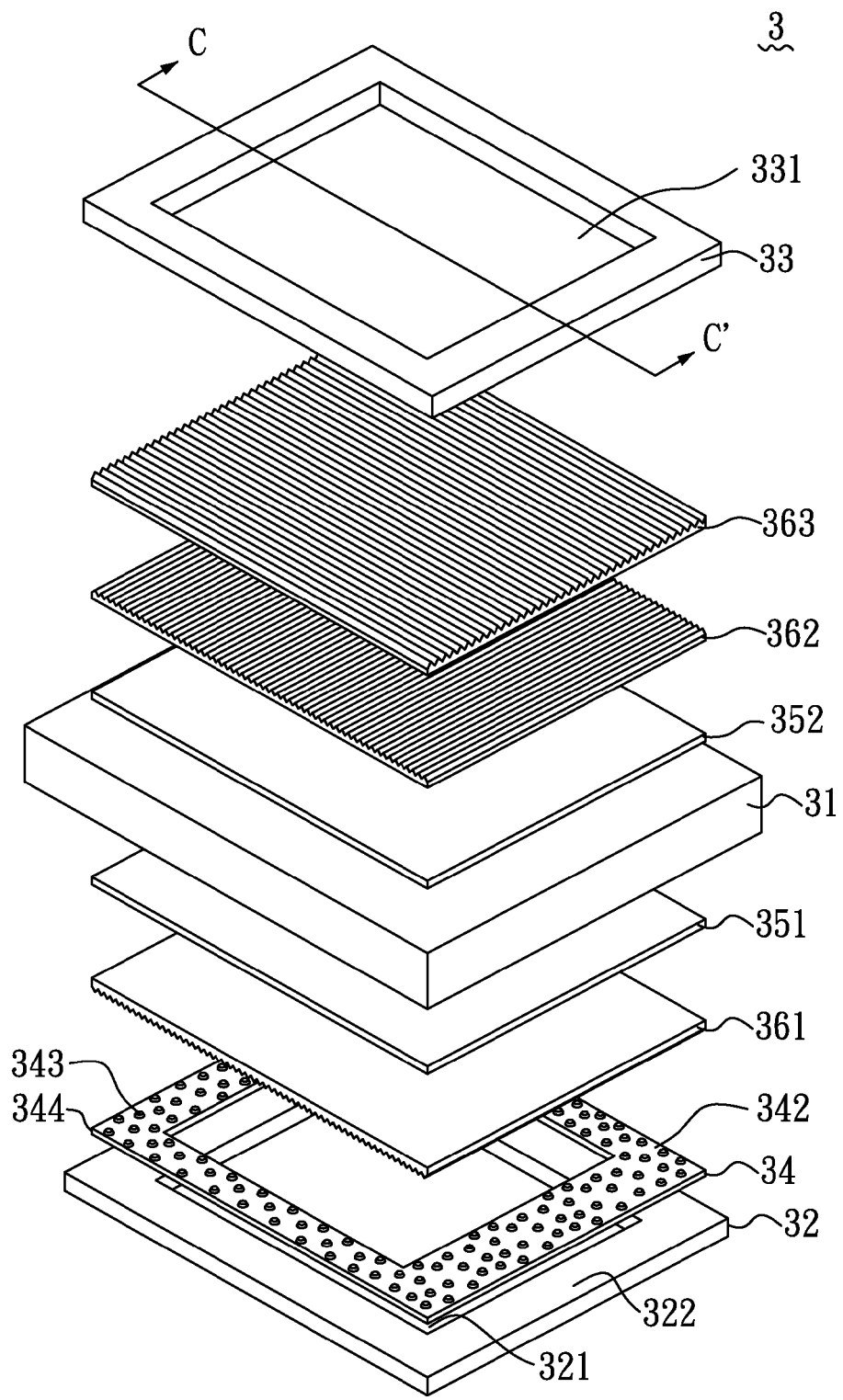
FIG. 3A is a perspective view of the backlight module according to a second embodiment of the present invention.
Figure 3B:
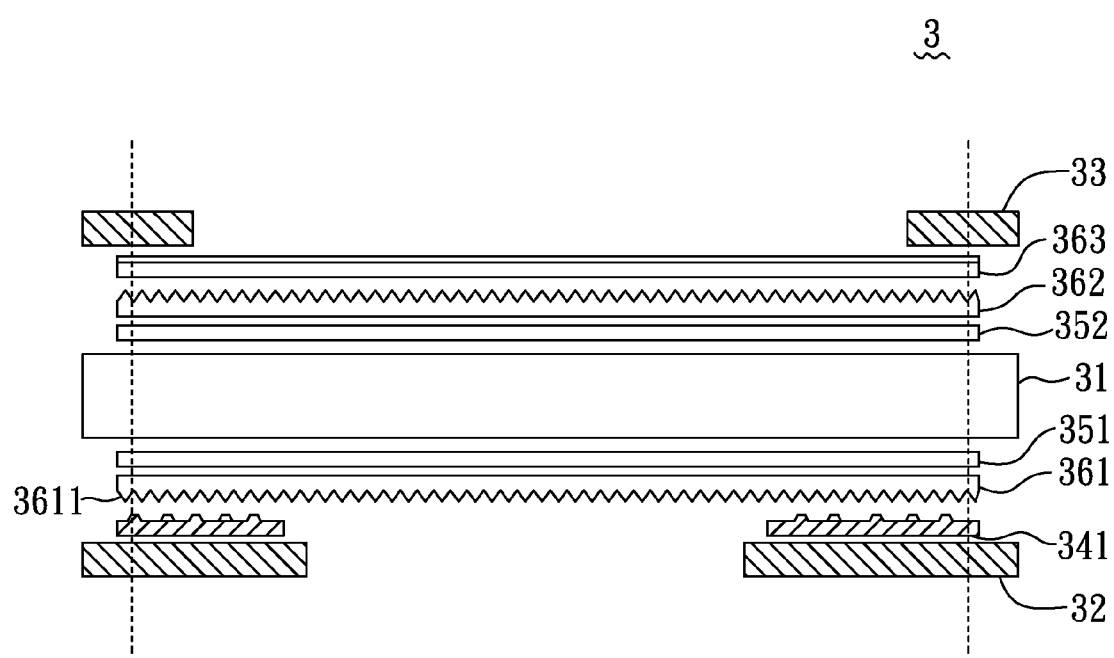
FIG. 3B is a cross sectional view taken along plane CC' of FIG. 3A.

With reference to FIG. 3A and FIG. 3B, wherein FIG. 3A is a perspective view of the backlight module according to a second embodiment of the present invention, and FIG. 3B is a cross sectional view taken along plane CC' of FIG. 3A.

As shown in FIG. 3A and FIG. 3B, the backlight module 3 is applied in a dual display module (not shown in the figures) and comprises: a light emitting unit 31, a first frame 32, a second frame 33, and a light diffusing plate 34; wherein the light emitting unit 31 is an organic electro luminescence light emitting unit (OLED), such as a white light organic electro luminescence light emitting unit. Besides, the first frame 32 is located below the light emitting unit 31 and a first display window 321 is enclosed by the first frame 32. The second frame 33 is located above the light emitting unit 31 and a second display window 331 is enclosed by the second frame 33. On the other hand, the first frame 32 has a first frame surface 322, and the light diffusing plate 34 is located between the first frame surface 322 of the first frame 32 and the light emitting unit 31. The light diffusing plate 34 has a smooth surface 341 and a rough surface 342 respectively on the two sides thereof; wherein the rough surface 342 is facing the light emitting unit 31.

As shown in FIG. 3A, the display area of the second display window 331 is larger than the display area of the first display window 321, thus the second display window 331 is referred to as the "main display window", and the first display window 321 is referred to as the "sub display window".

Moreover, as shown in FIG. 3A and FIG. 3B, the backlight module 3 can further comprise a first diffusing film 351 located between the light diffusing plate 34 and the light emitting unit 31, and a first brightness enhancement film 361 located between the light diffusing plate 34 and the first diffusing film 351. In the same manner, the backlight module 3 can further comprise a second diffusing film 352 located between the second frame 33 and the light emitting unit 31, and a second brightness enhancement film 362 located between the second frame 33 and the second diffusing film 352.

It should be noted that, in some situations, for example, where the backlight module according to the various embodiments of the present invention is required to have higher brightness and better uniformity, the backlight module 3 can further comprise a third brightness enhancement film 363 located between the second frame 33 and the second brightness enhancement film 362, for distributing the light from the second display window 331 (i.e. the main display window) more uniformly. Moreover, for brightness enhancement, the prism direction of the third brightness enhancement film 363 can be perpendicular to the prism direction of the second brightness enhancement film 362.

Besides, the aforementioned first diffusing film 351, the first brightness enhancement film 361, the second diffusing film 352, the second brightness enhancement film 362, and the third brightness enhancement film 363 are all optional optical elements. In other words, depending on the requirement of the optical performance, the backlight module according to various embodiments of the present invention can include different quantities of different types of diffusing films and/or brightness enhancement films to meet the industry's requirements.

Refer to FIG. 3A and FIG. 3B again, the first brightness enhancement film 361 of the backlight module 3 can be a prism brightness enhancement film, and the prism surface 3611 of the prism brightness enhancement film is opposed to the rough surface 342 of the light diffusing plate 34. Moreover, in the present embodiment, the light diffusing plate 34 can be a plain plate 344 having plural bumps 343 distributed thereon. The plain plate 344 can be made of polyethylene terephthalate (i.e. PET). Besides, the aforementioned bumps 343 are integrated with the plain plate 344 by an electroforming process, forming the light diffusing plate 34.

Therefore, when the main display window (i.e. the second display window 331) of the backlight module 3 displays, the light originally irradiated on the periphery portions of the sub display window (i.e. the first display window 321), i.e. the first frame surface 322, will arrive at the light diffusing plate 34, instead. Then, the light passes through the rough surface 342 of the light diffusing plate 34 and reaches the smooth surface 341 of the light diffusing plate 34. Some of the light is reflected at the smooth surface 341 due to the "total reflection effect". Finally, the reflected light transmits from the rough surface 342 of the light diffusing plate 34 to the light emitting unit 31. As a result, the light originally irradiated on the periphery portions of the sub display window (i.e. the first frame surface 322) will not cause a shadow image on the main display window (i.e. the second display window 331). In other words, the shadow image produced by the sub display window in the main display window, while the main display window is displaying, can be blurred, and even be eliminated thoroughly.

Figure 4A:
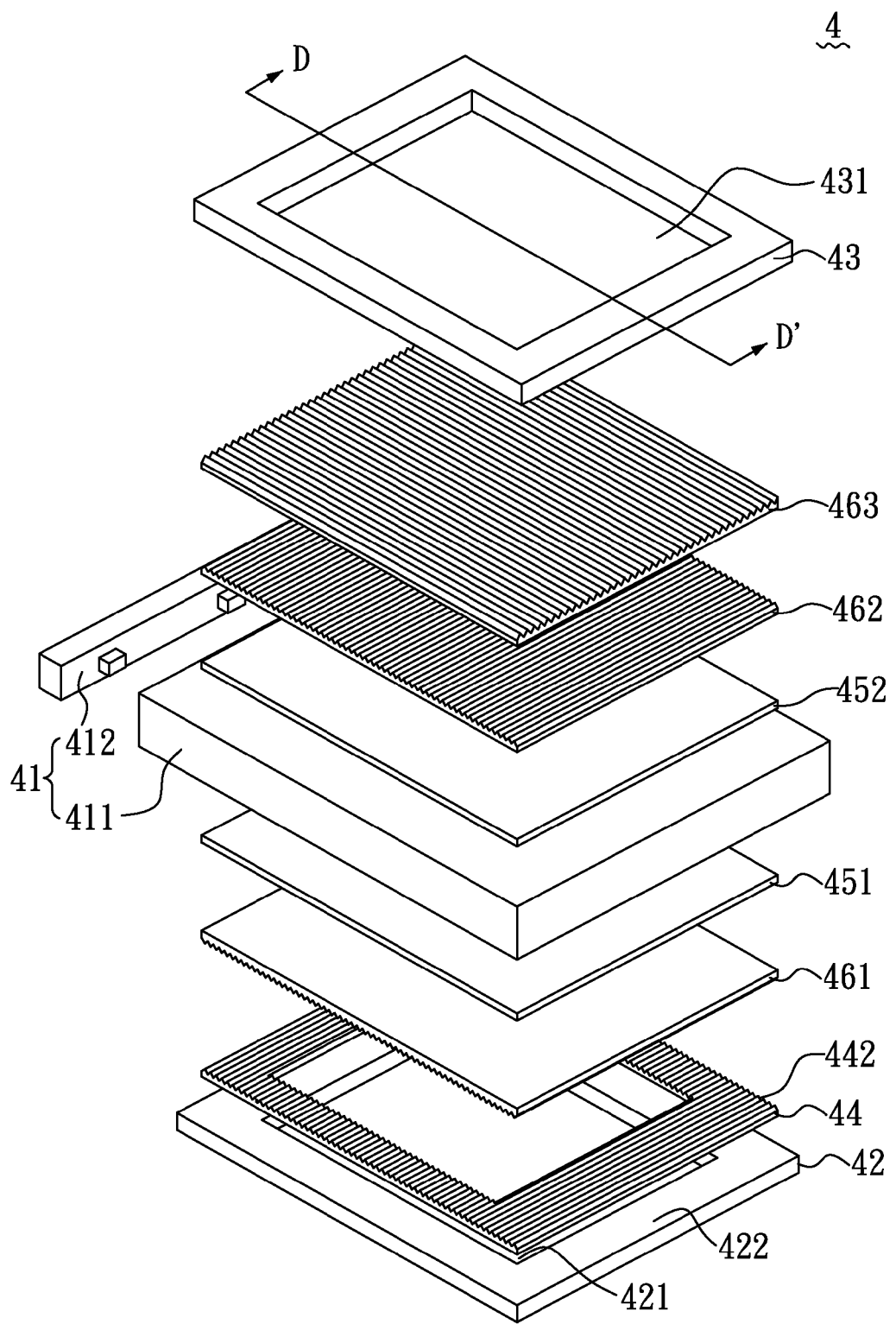
FIG. 4A is a perspective view of the backlight module according to a third embodiment of the present invention.
Figure 4B:
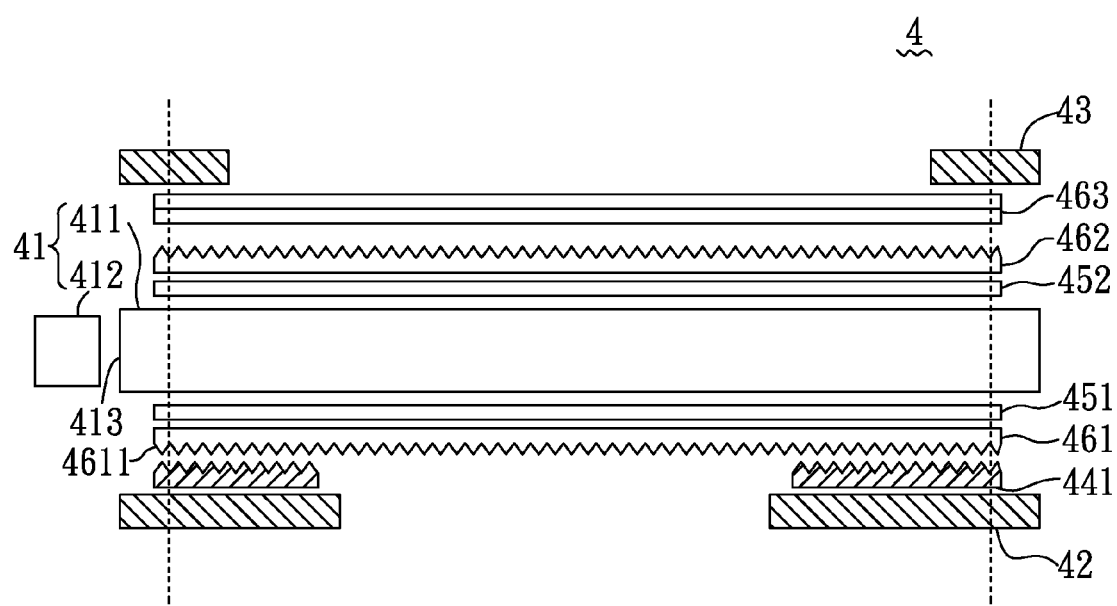
FIG. 4B is a cross sectional view taken along plane DD' of FIG. 4A.

With reference to FIG. 4A and FIG. 4B, wherein FIG. 4A is a perspective view of the backlight module according to a third embodiment of the present invention, and FIG. 4B is a cross sectional view taken along plane DD' of FIG. 4A.

As shown in FIG. 4A and FIG. 4B, the backlight module 4 is applied in a dual display module (not shown in the figures) and comprises: a light emitting unit 41, a first frame 42, a second frame 43, and a light diffusing plate 44; wherein the light emitting unit 41 includes a light guide plate 411 and a light source 412. In the present embodiment, the light source 412 is a light emitting diode light bar and located on one side edge 413 of the light guide plate 411. Besides, the first frame 42 is located below the light guide plate 411 and a first display window 421 is enclosed by the first frame 421. The second frame 43 is located above the light guide plate 411 and a second display window 431 is enclosed by the second frame 43. On the other hand, the first frame 42 has a first frame surface 422, and the light diffusing plate 44 is located between the first frame surface 422 of the first frame 42 and the light emitting unit 41. As shown in FIG. 4A and FIG. 4B, the light diffusing plate 44 has a smooth surface 441 and a rough surface 442 respectively on the two sides thereof; wherein the rough surface 442 is facing the light guide plate 411.

As shown in FIG. 4A, the display area of the second display window 431 is larger than the display area of the first display window 421, thus the second display window 431 is referred to as the "main display window", and the first display window 421 is referred to as the "sub display window".

Moreover, as shown in FIG. 4A and FIG. 4B, the backlight module 4 can further comprise a first diffusing film 451 located between the light diffusing plate 44 and the light guide plate 411, and a first brightness enhancement film 461 located between the light diffusing plate 44 and the first diffusing film 451. In the same manner, the backlight module 4 can further comprise a second diffusing film 452 located between the second frame 43 and the light guide plate 411, and a second brightness enhancement film 462 located between the second frame 43 and the second diffusing film 452.

It should be noted that, in some situations, for example, where the backlight module according to various embodiments of the present invention is required to have higher brightness and better uniformity, the backlight module 4 can further comprise a third brightness enhancement film 463 located between the second frame 43 and the second brightness enhancement film 462, for distributing the light from the second display window 431 (i.e. the main display window) more uniformly. Moreover, for brightness enhancement, the prism direction of the third brightness enhancement film 463 can be perpendicular to the prism direction of the second brightness enhancement film 462.

Besides, the aforementioned first diffusing film 451, the first brightness enhancement film 461, the second diffusing film 452, the second brightness enhancement film 462, and the third brightness enhancement film 463 are all optional optical elements. In other words, depending on the requirement of the optical performance, the backlight module according to various embodiments of the present invention can include different quantities of different types of diffusing films and/or brightness enhancement films to meet the requirement.

Refer to FIG. 4A and FIG. 4B again, the first brightness enhancement film 461 of the backlight module 4 can be a prism brightness enhancement film, and the prism surface 4611 of the prism brightness enhancement film is opposed to the rough surface 442 of the light diffusing plate 44. Moreover, in the present embodiment, the light diffusing plate 44 is also a prism brightness enhancement film, and the aforementioned rough surface 442 is a one dimensional prism matrix comprising plural prism bars with their longitudinal axes parallel to each other.

Therefore, when the main display window (i.e. the second display window 431) of the backlight module displays, the light originally irradiated on the periphery portions of the sub display window (i.e. the first display window 421), i.e. the first frame surface 422, will arrive at the light diffusing plate 44, instead. Then, the light passes through the rough surface 442 of the light diffusing plate 44 and reaches the smooth surface 441 of the light diffusing plate 44. Some of the light is reflected at the smooth surface 441 due to the "total reflection effect". Finally, the reflected light transmits from the rough surface 442 of the light diffusing plate 44 to the light guide plate 411. As a result, the light originally irradiated on the periphery portions of the sub display window (i.e. the first frame surface 422) will not cause a shadow image on the main display window (i.e. the second display window 431). In other words, the shadow image produced by the sub display window in the main display window, while the main display window is displaying, can be blurred, and even eliminated thoroughly.

On the other hand, since the light is arbitrarily reflected back to the light guide plate 411, the light can be used again as the light source, while the main display window (i.e. the second display window 431) is displaying images. As a result, the display brightness of the main display window (i.e. the second display window 431) is also increased.

Figure 5A:
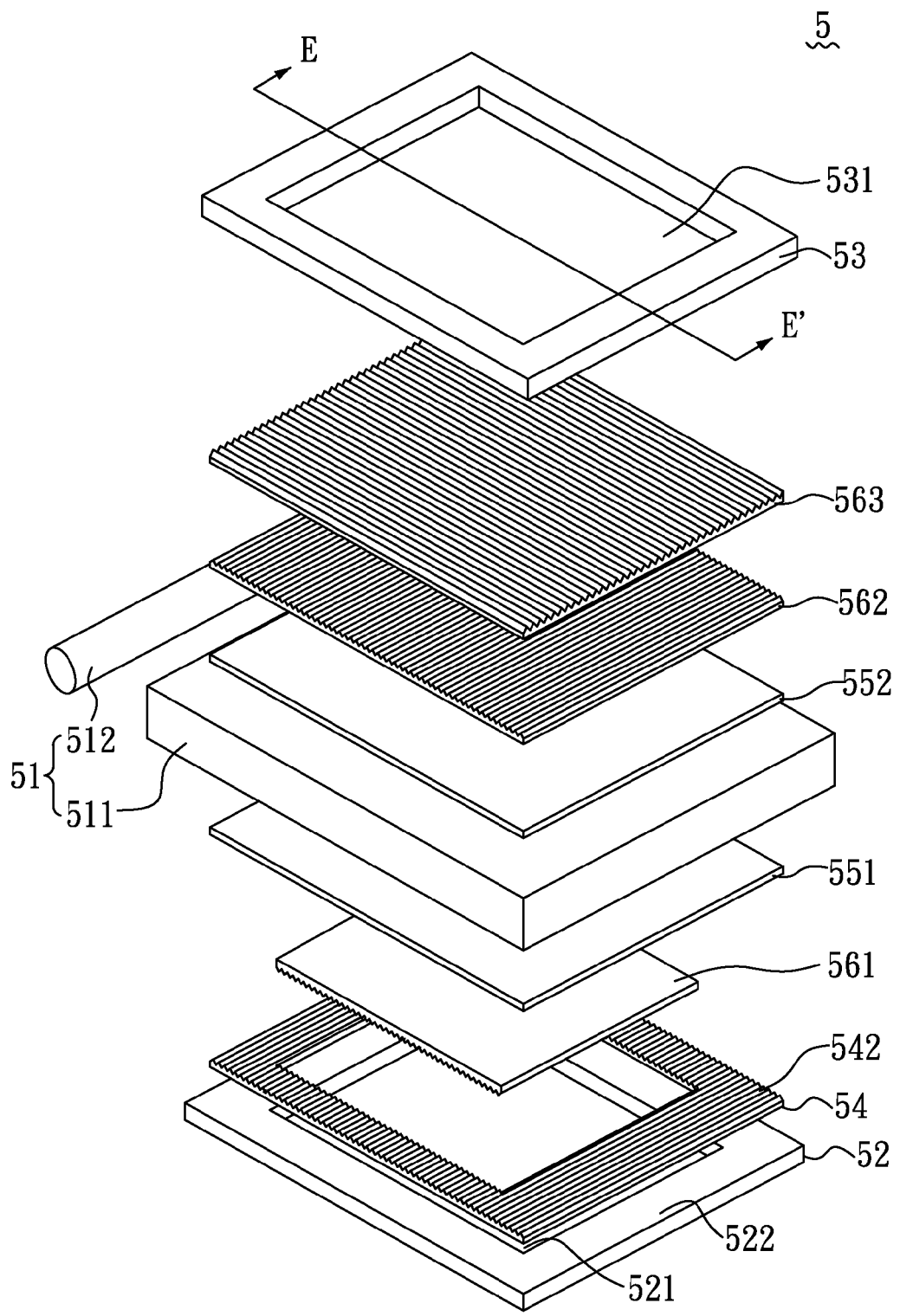
FIG. 5A is a perspective view of the backlight module according to a fourth embodiment of the present invention.
Figure 5B:
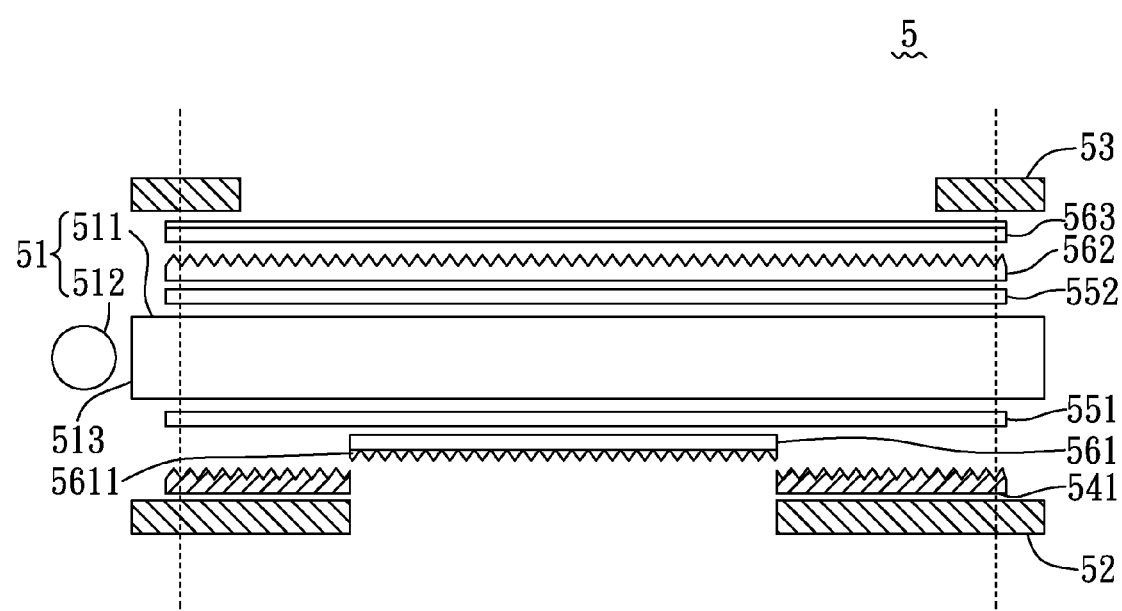
FIG. 5B is a cross sectional view taken along plane EE' of FIG. 5A.

With reference to FIG. 5A and FIG. 5B, wherein FIG. 5A is a perspective view of the backlight module according to a fourth embodiment of the present invention, and FIG. 5B is a cross sectional view taken along plane EE' of FIG. 5A.

As shown in FIG. 5A and FIG. 5B, the backlight module 5 is applied in a dual display module (not shown in the figures) and comprises: a light emitting unit 51, a first frame 52, a second frame 53, and a light diffusing plate 54; wherein the light emitting unit 51 includes a light guide plate 511 and a light source 512. In the present embodiment, the light source 512 is a cold cathode fluorescent lamp and located on one side edge 513 of the light guide plate 511. Besides, the first frame 52 is located below the light guide plate 511 and a first display window 521 is enclosed by the first frame 51. The second frame 53 is located above the light guide plate 511 and a second display window 531 is enclosed by the second frame 53. On the other hand, the first frame 52 has a first frame surface 522, and the light diffusing plate 54 is located between the first frame surface 522 of the first frame 52 and the light emitting unit 51. As shown in FIG. 5A and FIG. 5B, the light diffusing plate 54 has a smooth surface 541 and a rough surface 542 respectively on the two sides thereof; wherein the rough surface 542 is facing the light guide plate 511.

As shown in FIG. 5A, the display area of the second display window 531 is larger than the display area of the first display window 521, thus the second display window 531 is referred to as the "main display window", and the first display window 521 is referred to as the "sub display window".

Moreover, as shown in FIG. 5A and FIG. 5B, the backlight module 5 can further comprise a first diffusing film 551 located between the light diffusing plate 54 and the light guide plate 511, and a first brightness enhancement film 561 located between the light diffusing plate 54 and the first diffusing film 551. In the same manner, the backlight module 5 can further comprise a second diffusing film 552 located between the second frame 53 and the light guide plate 511, and a second brightness enhancement film 562 located between the second frame 53 and the second diffusing film 552.

It should be noted that, in some situations, for example, where the backlight module according to various embodiments of the present invention is required to have higher brightness and better uniformity, the backlight module 5 can further comprise a third brightness enhancement film 563 located between the second frame 53 and the second brightness enhancement film 562, for distributing the light from the second display window 531 (i.e. the main display window) uniformly. Moreover, for brightness enhancement, the prism direction of the third brightness enhancement film 563 can be perpendicular to the prism direction of the second brightness enhancement film 562.

Besides, the aforementioned first diffusing film 551, the first brightness enhancement film 561, the second diffusing film 552, the second brightness enhancement film 562, and the third brightness enhancement film 563 are all optional optical elements. In other words, depending on the requirement of the optical performance, the backlight module according to various embodiments of the present invention can include different quantities of different types of diffusing films and/or brightness enhancement films to meet the requirement.

Refer to FIG. 5A and FIG. 5B again, the first brightness enhancement film 561 of the backlight module 5 can be a prism brightness enhancement film. Moreover, in the present embodiment, the light diffusing plate 54 is also a prism brightness enhancement film, and the aforementioned rough surface 542 is a one dimensional prism matrix comprising plural prism bars with their longitudinal axes parallel to each other.

Therefore, when the main display window (i.e. the second display window 531) of the backlight module 5 displays, the light originally irradiated on the periphery portions of the sub display window (i.e. the first display window 521), i.e. the first frame surface 522, will arrive at the light diffusing plate 54, instead. Then, the light passes through the rough surface 542 of the light diffusing plate 54 and reaches the smooth surface 541 of the light diffusing plate 54. Some of the light is reflected at the smooth surface 541 due to the "total reflection effect". Finally, the reflected light transmits from the rough surface 542 of the light diffusing plate 54 to the light guide plate 511. As a result, the light originally irradiated on the periphery portions of the sub display window (i.e. the first frame surface 522) will not cause a shadow image on the main display window (i.e. the second display window 531). In other words, the shadow image produced by the sub display window in the main display window, while the main display window is displaying, can be blurred, and even eliminated thoroughly.

On the other hand, since the light is arbitrarily reflected back to the light guide plate 511, the light can be used again as the light source, while the main display window (i.e. the second display window 531) is displaying images. As the result, the display brightness of the main display window (i.e. the second display window 531) is also increased.

Figure 6:
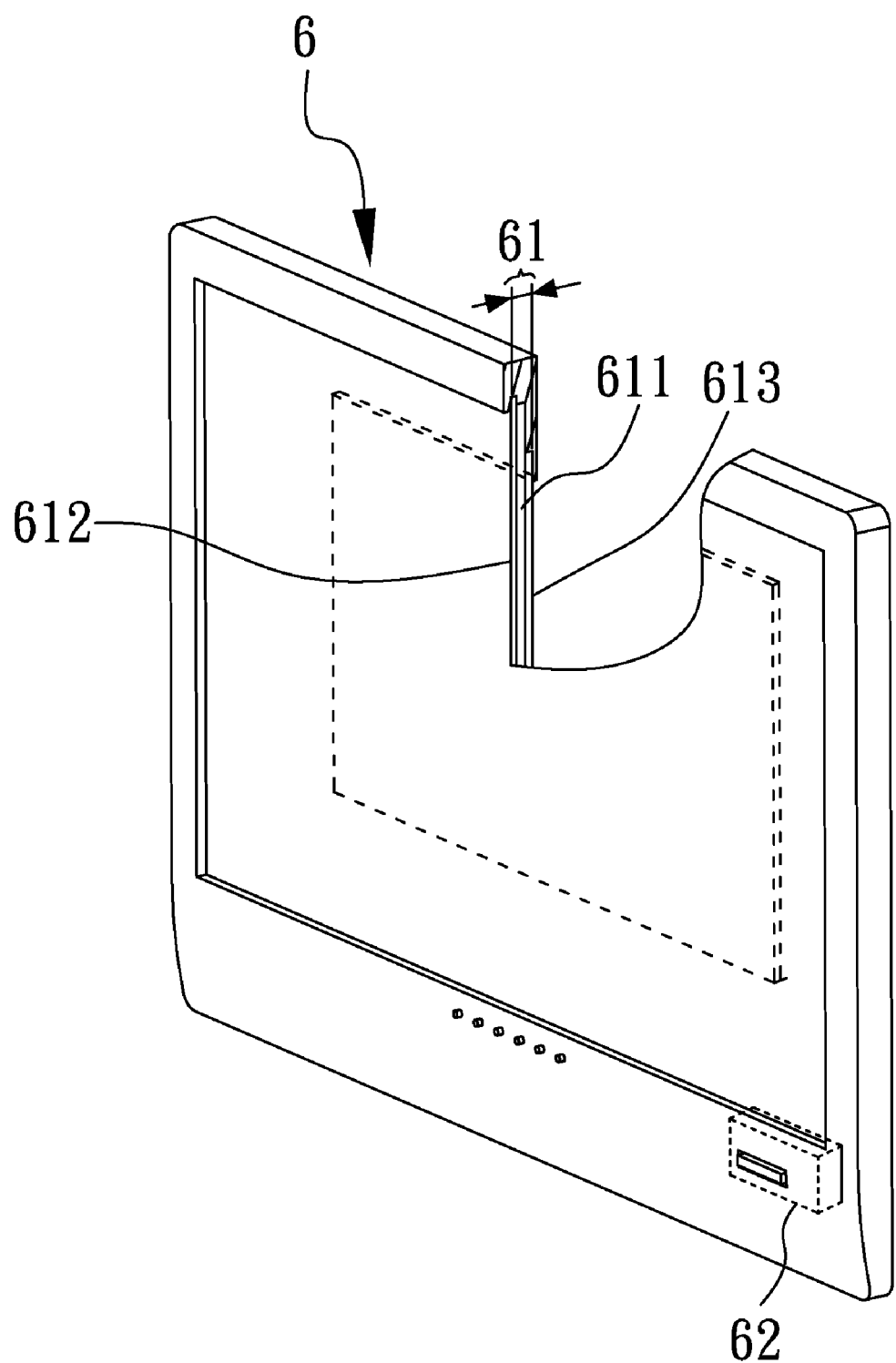
FIG. 6 is a perspective view of the electronic device of the present invention.

As shown in FIG. 6, which is perspective view of the electronic device of the present invention, the electronic device 6 comprises a dual display module 61, and a power supply module 62, wherein the dual display module 61 comprises a backlight module 611, a main display panel 612, and a sub display panel 613. The backlight module 611 can have the structure of the backlight module disclosed in the above embodiments, such as the ones shown in FIG. 2A and FIG. 2B, in FIG. 3A and FIG. 3B, in FIG. 4A and FIG. 4B, or in FIG. 5A and FIG. 5B. On the other hand, the main display panel 612 is located on one side of the backlight module 611. The sub display panel 613 is located on the other side of the backlight module 611 opposing to the main display panel 612.

When the main display panel displays images, the light source required is provided by the second display window of the backlight module 611, such as the second display window 231 shown in FIG. 2A, the second display window 331 shown in FIG. 3A, the second display window 431 shown in FIG. 4A, or the second display window 531 shown in FIG. 5A. When the sub display panel displays images, the light source required is provided by the first display window of the backlight module 611, such as the first display window 221 shown in FIG. 2A, the first display window 321 shown in FIG. 3A, the first display window 421 shown in FIG. 4A, or the first display window 521 shown in FIG. 5A. The power supply module 62 is electrically connected with the dual display panel 61, for providing the electrical power required for the operation of the dual display module 61. The electronic device 6 can be a cellular phone, a digital camera, a personal digital assistant, a notebook computer, a desktop computer, a television, a GPS device, an automotive display, an aeronautical display, a digital photo frame, or a portable DVD player.

Although the present invention has been explained in relation to its preferred embodiment, it is to be understood that many other possible modifications and variations can be made without departing from the scope of the invention as hereinafter claimed.

What is claimed is:

1. A backlight module, comprising:
   a light emitting unit;
   a first frame located on one side of the light emitting unit and a first display window is enclosed by the first frame, wherein the first frame has a first frame surface;
   a second frame located on the other side of the light emitting unit opposing to the first frame and a second display window is enclosed by the second frame, wherein the display area of the second display window is larger than the display area of the first display window; and
   a light diffusing plate located between the first frame surface of the first frame and the light emitting unit, wherein the light diffusing plate has a smooth surface and a rough surface respectively on the two sides thereof and light is transmittable between the smooth surface and the rough surface of the light diffusing plate;
   wherein the rough surface of the light diffusing plate is facing the light emitting unit, and wherein the light diffusing plate defines an opening corresponding to the first display window.

2. The backlight module as claimed in claim 1, wherein the light emitting unit is an organic electro luminescence light emitting unit.

3. The backlight module as claimed in claim 1, wherein the light emitting unit further comprises a light guide plate and a light source located on one side edge of the light guide plate.

4. The backlight module as claimed in claim 3, wherein the light source is a light emitting diode light bar or a cold cathode fluorescent lamp.

5. The backlight module as claimed in claim 1, further comprises a first diffusing film located between the light diffusing plate and the light emitting unit.

6. The backlight module as claimed in claim 5, further comprises a first brightness enhancement film located between the light diffusing plate and the first diffusing film.

7. The backlight module as claimed in claim 6, wherein the first brightness enhancement film is located on a whole surface of the first diffusing film.

8. The backlight module as claimed in claim 6, wherein the first brightness enhancement film is located on a partial surface of the first diffusing film.

9. The backlight module as claimed in claim 6, wherein the first brightness enhancement film is a prism brightness enhancement film, and the prism surface of the prism brightness enhancement film is opposing to the rough surface of the light diffusing plate.

10. The backlight module as claimed in claim 1, wherein the light diffusing plate is a prism brightness enhancement film.

11. The backlight module as claimed in claim 1, wherein the rough surface of the light diffusing plate is a one dimensional prism matrix, and the one dimensional prism matrix comprises plural prism bars with their longitudinal axes parallel to each other.

12. The backlight module as claimed in claim 1, wherein the rough surface is formed by electroforming plural bumps on the surface of the light diffusing plate.

13. The backlight module as claimed in claim 1, further comprises a second diffusing film located between the second frame and the light emitting unit.

14. The backlight module as claimed in claim 13, further comprises a second brightness enhancement film located between the second frame and the second diffusing film.

15. The backlight module as claimed in claim 14, further comprises a third brightness enhancement film located between the second frame and the second brightness enhancement film.

16. An electronic device, comprising:
    a dual display module comprising a backlight module as claimed in claim 1, a main display panel, and a sub display panel; wherein the main display panel is located on one side of the backlight light module, the sub display panel is located on the other side of the backlight module opposing the main display panel; and
    a power supply module electrically connected with the dual display panel, for providing the electrical power to the dual display module.

17. The electronic device as claimed in claim 16, wherein the electronic device is a cellular phone, a digital camera, a personal digital assistant, a notebook computer, a desktop computer, a television, a GPS device, an automotive display, an aeronautical display, a digital photo frame, or a portable DVD player.

18. The backlight module as claimed in claim 1, wherein the opening of the light diffusing plate has an area substantially equal to or larger than area of the first display window.

19. The backlight module as claimed in claim 1, wherein the opening of the light diffusing plate is not smaller than area of the first display window.

20. The backlight module as claimed in claim 1, wherein the light diffusing plate does not extend into the first display window.

* * * * *